Sept. 13, 1955 R. C. ZEIDLER 2,717,673
DRIVE MECHANISM
Filed March 9, 1949 3 Sheets-Sheet 1

Fig. 1

Inventor:
Reinhold C. Zeidler

Sept. 13, 1955  R. C. ZEIDLER  2,717,673
DRIVE MECHANISM
Filed March 9, 1949  3 Sheets-Sheet 3

Inventor:
Reinhold C. Zeidler

United States Patent Office 2,717,673
Patented Sept. 13, 1955

2,717,673

DRIVE MECHANISM

Reinhold C. Zeidler, Detroit, Mich., assignor to Borg-Warner Corporation, Chicago, Ill., a corporation of Illinois Application March 9, 1949, Serial No. 80,519

28 Claims. (Cl. 192—3.2)

The present invention relates generally to a drive mechanism for operatively connecting driving and driven shafts. By way of example, the present mechanism may be employed for the purpose of connecting a motor crankshaft to the input driven shaft or shafts of a transmission used in motor vehicles. More particularly, the improvements contemplated herein are directed to a novel drive mechanism embodying a hydraulic torque converter which can be cooperatively associated as a unit with driving and driven shafts; and, if desired, the drive mechanism may include a friction clutch associated with the torque converter to provide a unitary assembly connectible, as such, to driving and driven shafts.

It is one of the principal objects of this invention to simplify the construction of a drive mechanism, such as contemplated herein, and to provide novel methods of assembling such mechanism and cooperatively associating the mechanism, as a unit, with driving and driven shafts.

It is also a principal object hereof to provide a drive mechanism, wherein the various component parts of such mechanism are constructed in a manner which adapts them for ready fabrication as separate structures, and thereafter a plurality of such structures may be put together or combined into a complete drive mechanism assembly, and such assembly will then be adapted for attachment, as a unit, between driving and driven shafts, all of which is effected by a novel method of assembly. This permits the fabrication of these individual or independent structures as parts of the drive mechanism at different locations in a factory, and then the combining of these structures in the factory to provide a complete drive mechanism assembly which forms a unit adapted for installation wherever needed.

An advantage flowing from this arrangement is that the drive mechanisms may be assembled at the factory and sent as individual units to companies employing the drive mechanism between an engine and a power-driven machine or device to provide a power transmission assembly, for example, manufacturers of automobiles, who may quickly and facilely install the drive mechanisms between the driven shaft of a power-providing device, such as an engine, and an input shaft or shafts connected to power-driven devices, such as the transmissions of automobiles, with a minimum amount of time and labor and without the present conventional practice involving the time-taking and tedious piece-meal assembly of a multitude of parts of drive mechanisms with each other and the engine driven shaft and the input shaft or shafts connected to the power-driven devices.

Another advantage is that repair shops may purchase or keep on hand a supply of one or more completely assembled new or rebuilt drive mechanisms for replacing a damaged drive mechanism in a power transmission assembly, and it will be apparent that the simple transfer operation required, in which the damaged drive mechanism, as a unit, is merely removed and the replacement drive mechanism readily and quickly installed by a mechanic, is very desirable due to the considerable decrease in the usual expense involved in the present piece-meal disassembly of a damaged conventional drive mechanism and then attempting to place it in operative condition by repairing or duplicating the damaged parts thereof and then reassembling the mechanism, either of which procedures usually consumes considerable time and labor and requires the employment of a mechanic specially trained to understand complex structures, such as drive mechanisms embodying fluid torque converters, to service the drive mechanisms. It is contemplated that my improved drive mechanism, if damaged, may be readily removed from the power transmission assembly, such as used in automobiles, and be returned to the factory of the manufacturer of the drive mechanisms, where it will be rebuilt by skilled mechanics who fully understand the structure of the drive mechanism and are trained to readily replace the damaged parts thereof. Also, it is apparent that these replacement parts are more accessible at the factory and owing to the novel arrangement of the component parts of my drive mechanism, the removal of damaged parts and the replacement of new parts may be quickly accomplished and the rebuilt assembly sold as such.

Another object of the present improvement resides in the particularly novel construction and arrangement of the different parts of the drive mechanism, and particularly the component parts of the torque converter unit of the drive mechanism which permits these parts to be successively arranged, one forwardly of the other, to provide a unitary assembly. By reason of this arrangement, the drive mechanisms can be quickly assembled at the factory to provide maximum production within a minimum of time. Also, when a damaged drive mechanism is to be serviced at the factory, the torque converter assembly may be readily disassembled in successive reverse order, by first removing the forward part, and then the next succeeding part or parts, until the damaged part or parts have been removed and been replaced, after which the removed undamaged parts can be remounted to complete the assembly of the drive mechanism.

A further object of the invention is the provision of an improved hydraulic torque converter assembly including a novel arrangement of thrust washers with the pump, stator and turbine elements of the converter assembly and adapted to take thrust forces only under certain operating conditions of the converter assembly whereby frictional wear of the thrust washers is minimized and the useful life of the converter prolonged.

Additional objects, aims, and advantages of the improvements contemplated herein will be apparent to persons skilled in the art, after the construction and arrangements of the drive mechanism is understood from the within description.

It is preferred to accomplish the numerous objects hereof and to practice the invention, in substantially the manner hereinafter fully described and as more particularly pointed out in the appended claims. Reference is now made to the accompanying drawings forming a part of this specification:

In the drawings.

The drawings are to be understood as being more or less of a diagrammatic character, for the purpose of illustrating typical or preferred forms of the present improvements. In these drawings, like reference characters identify the same parts in the different views.

Figure 1:
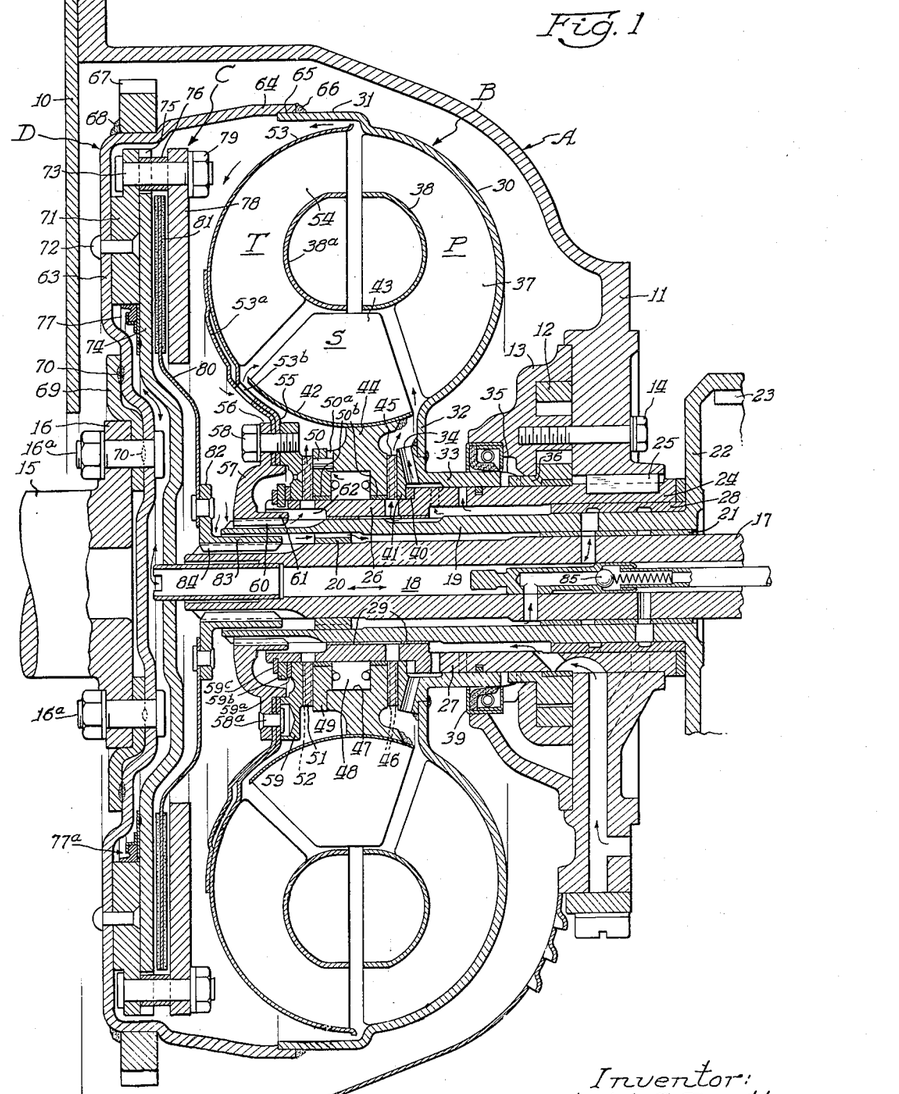
Fig. 1 is a longitudinal, axial section of a drive mechanism embodying the present improvements and illustrated as operatively connecting a drive shaft to one or more shafts of a transmission, such as used in motor driven vehicles.
Figure 2:
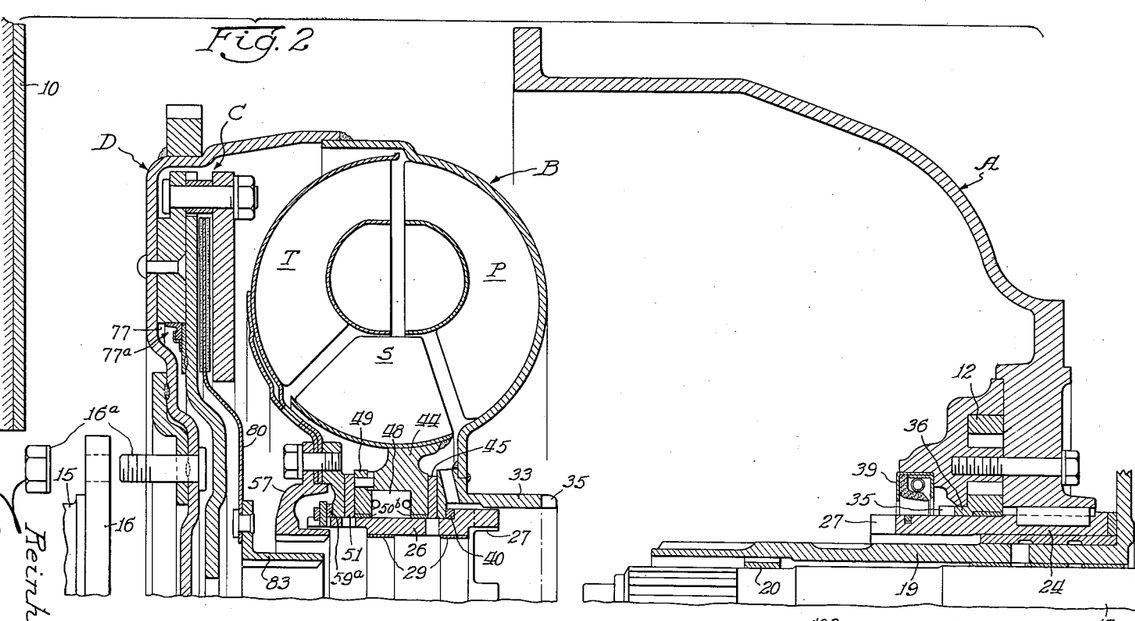
Fig. 2 is a view similar to Fig. 1, showing the drive mechanism separated axially from its respective supports, such as the illustrated engine crankshaft and the transmission input shafts, for the purpose of illustrating the manner of assembling the drive mechanism as a unit with these shafts by the automobile manufacturer, the views showing only the upper half portions of the mechanism.
Figure 3:
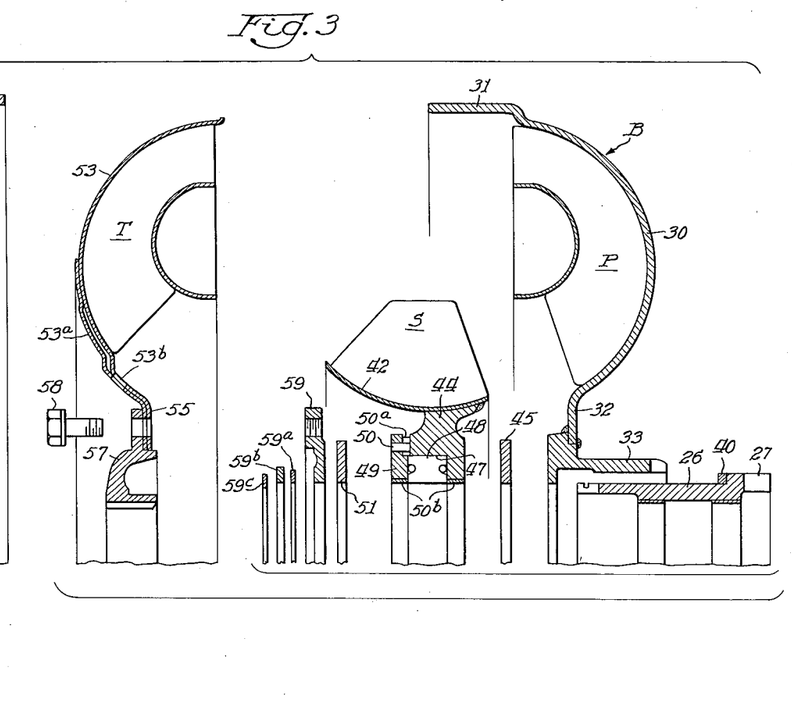
Fig. 3 is a view of the drive mechanism of Figs. 1 and 2, showing the component elements of the drive mechanism, with the flywheel and friction clutch units assembled, and the parts of the torque converter unit separated axially for the purpose of illustrating the manner of successively assembling the parts at a factory to provide the torque converter unit.

Referring to Figs. 1 and 2, illustrating the drive mechanism assembled with and separated axially from an engine crankshaft 15 and transmission input shafts 17 and 19 in the respective views, the mechanism is enclosed in a bell-housing A and comprises a torque converter unit B, a clutch unit C and a flywheel unit D. The housing A is secured to a fixed portion 10 of the motor or the vehicle chassis and extends rearwardly therefrom. This bell-housing has a radially arranged rear end wall 11 which is suitably apertured to receive a plurality of transmission shafts and the like, and there is a gear pump 12 within the bell-housing alongside the rear wall 11, said pump being enclosed in a pump casing 13 that is attached to the rear end wall by bolts 14. The drive mechanism is enclosed in the bell-housing and the hydraulic torque converter assembly or unit B and flywheel unit D are cooperatively associated for connecting a drive shaft, such as the engine crankshaft 15, to an input or driven shaft of a transmission, such as the shaft 19. The drive mechanism may also optionally comprise the friction clutch assembly or unit C which may be associated with the flywheel group as a unitary structure as shown in Fig. 3, or the clutch unit C may be assembled with the flywheel and torque converter units D and B, as shown in Figs. 1 and 2, to provide a unitary assembly. The flywheel unit D and clutch unit C are utilized to directly connect the engine crankshaft 15 to the input shaft 17 of a transmission.

Referring to Fig. 1, the motor crankshaft or drive shaft 15 has one end thereof extending into the bell-housing through an opening in the fixed portion 10, and within the housing said shaft has a radial flange 16 connected to plates 63 and 69, forming portions of the flywheel assembly hereinafter described, and the plates 63 and 69 are securely fastened to and held in concentric relation to the crankshaft 15 by bolt and nut assemblies 16a. The plate 63 is drivingly connected to the pump P of the torque converter B and may be used to support and drive certain members of the friction clutch assembly C, as hereinafter described.

The driven or input transmission shaft 17, having a central bore 18, enters the bell-housing through a suitable opening in the rear end wall 11, and said driven shaft extends in a forwardly direction to adjacent the radial plane of the friction clutch assembly C. The rear portion of the driven shaft 17 extends into the usual transmission housing, where it is connected to certain of the gears of the transmission which is not shown, but which may be any suitable type, the shaft 17 being supported on bearings in the transmission. A hollow quill shaft 19 surrounds the driven shaft 17 and is rotatably journaled thereon upon suitable bushings or bearings 20 and 21, and said quill shaft is arranged with its inner or forward end terminating rearwardly of the adjacent inner end of the driven shaft 17. The rearmost end of quill shaft 19 may be provided with a radial flange 22 which is outside the bell-housing A and has an axial wall portion or flange formed with a ring gear 23 which comprises a portion of a planetary gearing, such as commonly used in motor vehicle transmissions. However, it will be apparent that the shafts 17 and 19 can be considered to be output driven shafts of the drive mechanism and, accordingly, the shafts may be directly connected to any other suitable instrumentality desired to be driven, such as pulleys, universal joints, etc. connected to machines or mechanisms, such as generators, compressors and the like; or the shafts may be the input shafts of power-driven devices or machines.

A two-part reaction sleeve, surrounding the quill shaft 19, has a fixed rear section 24 which is prevented from rotation by being keyed as at 25 in the opening in the rear end wall 11 of the bell-housing, and the second section 26 of this sleeve has a floating connection with the fixed section 24 as by means of a plurality of tongue and notch arrangements shown at 27. The floating section 26 of the reaction sleeve forms a portion of the torque converter unit B as will be later described. A bearing 28 pressed into the fixed section 24 of the reaction sleeve provides means for holding the quill shaft 19 in concentric relationship with respect to the driven shaft 17, and other bushings or bearings 29 are pressed into the floating section 26 of the reaction sleeve, and these bearings 29 run on shaft 19 to hold the section 26 concentric with the shafts 17 and 19.

Referring now to the drive mechanism in detail, the hydraulic torque converter, identified generally as B, comprises a plurality of assemblies or structurally independent units to-wit: a pump or impeller assembly P, a stator assembly S, and a turbine assembly T.

The pump or impeller assembly P comprises a semi-torus-shaped shell 30 having an outer axially extending flange 31 and an inner extending radial flange 32, the latter being mounted upon a shouldered radially extending portion of a suitably shaped hub 33 surrounding the sections 24 and 26 of the reaction sleeve, said radial hub portion having an outwardly extending hole 34 which communicates with the interior of the torque converter B. The hub 33 is preferably cylindrical and has a tongue and notch connection as at 35, with a driving portion 36 of the gear pump 12. The shell 30 of the pump or impeller unit P has a plurality of vanes 37 extending in a generally radially outward direction, and each vane has an outer contour of segmental shape, while the central regions of said vanes have the usual arcuate core rings 38 suitably attached thereto or integral therewith. A seal ring 39 is inserted in a recess in the forward wall of the pump casing 13 to prevent the passage of pressure fluid into the housing A. A thrust bearing washer 40 is fitted against a shoulder on the floating reaction sleeve section 26, and said ring is abutted by a radially inwardly extending flange 41 of the hub 33.

The stator assembly S comprises a semi-torus shaped shell 42 having vanes 43 extending in a generally radial outward direction, and said shell is secured to an irregularly shaped saddle-like hub 44 mounted on the floating section 26 of the reaction sleeve and adjacent the hub 33 of the previously mounted pump or impeller unit P. A thrust washer 45, having oil channels 46 in its side faces, is placed between the pump hub 33 and the stator hub 44 to space these hubs from each other. An annular recess 47 is made in the stator hub 44, said recess being open in a forward direction for the ready insertion of an overrunning clutch 48, which may be of the sprag type as shown, that is maintained in said recess preferably by means of a cover or collar 49 which is held in place by a pin 50 on said collar that projects into a notch 59a in hub 44. A thrust washer 51 is placed against the forward face of cover 49, said washer having radial oil channels 52 in its forward and rearward faces, the same as the corresponding thrust washer 45 against the opposite or rearward face of hub 44.

The turbine or runner assembly or unit T comprises a semi-torus shaped shell 53 having generally radial vanes 54 of a segmental outer contour, and the radial outer portion of said shell 53 terminates inside the flange 31 of the pump assembly P. The vanes 54 of the turbine have their central regions provided with the usual arcuate core ring member 38a in cooperative association with the core ring 38 on the pump vanes 37. The shell 53 is exteriorly engaged by a reinforcing plate 53a. The shell 53 and the plate 53a adjacent their hubs have equalizer ports 53b for permitting entry of the hydraulic fluid into the torque converter assembly, as shown in Fig. 1. The radial inner portions of the turbine shell 53 and plate 53a have radially inwardly extending flange portions 55 which are located alongside the radial flange 56 of the turbine hub 57, to which said flanges are secured by rivets 58a and also by bolts 58 extending through the hub flange 56 and flange portions 55 and threaded into a thrust ring flange 59 positioned rearwardly of the hub 57 and rotating about the floating section 26 of the reaction sleeve. The thrust ring flange contacts the thrust washer 51. Mounted on the forward end of the section 26 of the reaction sleeve and adjacent the thrust ring flange 59 is a thrust washer 59a and a thrust plate 59b held in assembly with the flange 59 and on the section 26 by a lock ring 59c fitted within a groove in the section 26. As seen in Fig. 1, the turbine or runner assembly has its hub 57 splined as at 60 on the adjacent end region of the quill shaft 19, and the cylindrical portion 61 of the turbine hub extends rearwardly and is telescoped inside the forward portion of the floating sleeve section 26, the latter being recessed at 62 to receive said cylindrical portion 61.

The flywheel assembly D is connected to the pump P of the torque converter B and also can be utilized to carry certain members of the friction clutch asembly C. For this purpose, the flywheel assembly is arranged forwardly of the clutch assembly C and the hydraulic torque converter assembly B, as seen in Fig. 1. The flywheel assembly D comprises a dished-shaped metal plate 63 having an axial flange or rim 64 that is shouldered at 65 to receive the axially extending outer flange 31 of the pump unit P so that, when the parts are assembled, said flanges may be secured together by an outside weld 66. A ring gear 67 is welded as at 68 to the outer and forward portion of the dished plate 63 and a reinforcing intermediate disc-like annulus 69 is welded as at 70 to the central region of the dished plate 63. These members of the flywheel assembly are secured to the flange 16 of the crankshaft 15 by bolt and nut assemblies 16a. It will be apparent that the crankshaft 15 can deliver engine torque to the pump P of the torque converter B, which will cause a toroidal circulation of the fluid in the converter causing rotation of the turbine T of the converter and the transmission of torque to the transmission input shaft 19. It may be noted that the flywheel and torque converter assembly provide a unitary structure, which may be employed to connect an engine-driven shaft, such as the shaft 15, and transmission having only one input shaft.

In the event a friction clutch, such as the clutch C, may be required to provide a torque path between a crankshaft, such as the shaft 15, and another transmission input shaft, such as the shaft 17, a heavy spacer plate 71 of annular shape can be secured by rivets 72 to the rearward face of dished plate 63, and a plurality of headed studs 73 can be passed through the reduced and shouldered outer region of said annular spacer plates 71 for supporting certain clutch members now to be described.

As above stated, the friction clutch assembly C, which effects a direct drive between the motor shaft 15 and the driven transmission shaft 17, comprises the plate 71 secured to the flywheel unit by rivets 72 and on which plate studs 73 support certain portions of the clutch. The pressure plate 74 of the friction clutch C comprises an irregularly shaped metal stamping, the outer margin of which is provided with recesses 75 extending inwardly from the edge for accommodating the studs 73, and these studs are surrounded by spacer collars 76 extending rearwardly from the back face of the spacer annulus 71. In the present assembly, the pressure plate 74 is of a piston-like character and is adapted to be operated by pressure fluid which enters the pressure chamber 77 defined by the pressure plate 74 and the dished mounting plate 63. A gasket ring 77a of rubber or the like is disposed in the chamber 77 at the juncture of the plate 74 and annulus 71 to provide a leak-proof seal preventing the escape of pressure fluid between the plate 74 and annulus 71 during actuation of the plate 74. An annular clutch back plate 78 is transversely bored at its outer margin to receive the studs 73, and it is held in place by nuts 79 threaded on the projecting rearward ends of said studs, the back plate being held in fixed relation to the spacer plate 71 by means of the spacer collars 76. The clutch driven plate 80, which is of the friction facing type, has its friction facings 81 arranged between the back plate 78 and the piston-like pressure plate 74. At its central inner region, the clutch driven plate is attached to the radially extending flange 82 of an elongate sleeve-like hub 83 which is splined as at 84 to the adjacent forward portion of the driven shaft 17, and a portion of this hub extends under the forward end portion of the quill shaft 19 as clearly shown in Fig. 1. It is here noted that the rearward portion of this clutch plate hub 83 also is in telescopic relation to the rearward cylindrical portion 61 of the turbine assembly hub 57. This effects a very compact arrangement and positions the friction or direct drive clutch C forward of and in close proximity to the torque converter assembly B, thereby reducing the overall dimension of the whole mechanism.

Referring to Fig. 3, the drive mechanism is there shown with the flywheel and clutch units D and C in assembled relation and the component parts of the torque converter B in axially spaced relation to each other and the flywheel and clutch assembly, for the purpose of illustrating the disposition of the parts of the torque converter B prior to and for assembly with the assembled flywheel and clutch units D and C, at the factory of the manufacturer of the drive mechanism, to provide a completely assembled drive mechanism as shown in Fig. 2, which can be shipped directly to the automobile manufacturer for installation as a unitary assembly between the crankshaft and transmission input structures of an automobile.

Considering first the factory operations involved in the production of the drive mechanism, the component parts of each of the flywheel, clutch and torque converter units D, C, and B, respectively, may be manufactured individually and separately and then assembled in the manner hereinafter described to provide the particular unit or units. Thereafter, the flywheel, clutch and torque converter units can be assembled to provide the complete drive mechanism.

In the factory assembly of the various parts of the flywheel unit D, the plate 63 has the ring gear 67 positioned thereon and secured thereto by the weld 68. The plate 63 and the reinforcing annulus 69 are connected together by a weld 70 and a plurality of openings are provided for receiving the bolts of the bolt and nut assemblies 16a. It may be noted that the bolts are pressed into place in the openings in the plate 63 and annulus 69 and are thus firmly held with the threaded portions of the bolts extending outwardly of the assembly.

The clutch unit or assembly C comprises the annular spacer plate 71 having openings between the radially inner and outer edges thereof receiving rivets 72 extending outwardly therefrom for reception in openings in the plate 63 of the flywheel unit D, and a plurality of studs 73 are positioned in the openings in the peripheral margin of the plate 71 and, upon which may be successively positioned the annular pressure plate 74, the spacer collars 75, and back plate 78, (the clutch driven plate 80 being positioned against the plate 74 prior to mounting the plate 78 on the studs 73), and thereafter threading the nuts 79 on the studs to maintain the clutch in assembly. The seal ring 77a is readily attachable to the plate 74 prior to assembling the described parts of the clutch. It may be noted that the clutch C comprises a unitary assembly which can be connected to the flywheel unit D by positioning the clutch assembly within the plate 63 of the flywheel unit, locating the rivets 72 within the openings in the plate 63, and then upsetting the ends of the rivets protruding exteriorly of the plate 63 to secure the clutch assembly to the flywheel unit. A considerable advantage is obtained by independently assembling the parts of each of the flywheel and clutch assemblies to provide separate units which can be readily connected by the rivets 72 to form a single flywheel and clutch assembly.

Referring now to the torque converter B and the assembly of the component parts thereof into a complete unit, the impeller, turbine and stator assemblies are assembled independently of each other and thereafter these assemblies or component parts, and other component spacing and connecting parts can be connected together to form a unitary structure which may be secured to the flywheel unit D.

More particularly, the pump or impeller assembly P comprises the vaned shell 30 having its inner extending radial flange 32 mounted on the hub 33 and welded thereto as shown in Fig. 3. The stator assembly S comprises the shell 42 secured by a suitable weld, as shown, to the hub 44; and the overrunning clutch 48 which is inserted in the annular recess 47 in the hub 44 and retained therein by the cover 49 which is held in engagement with the hub 44 by a pin 50 on the collar projecting into the notch 50a in the hub 44. The turbine assembly T comprises the shell 53 and reinforcing plate 53a and their radially inner annular flanges 55 receive the turbine hub 57 for mounting the shell and plate on the hub.

Considering now the assembly of the described pump, stator and turbine assemblies with the other component parts of the torque converter B to provide a unitary structure as shown in Fig. 3, the pump assembly P and stator assembly S, shown in Fig. 2, are first connected together to form a unitary assembly by moving the pump assembly P toward the right to position the section 26 of the reaction sleeve with the thrust washer 40 thereon within the pump hub 33. The thrust washer 45 and the stator assembly, including the overrunning clutch 48 and cover 49, are then moved toward the right and positioned on the section 26 of the reaction sleeve. The thrust washer 51, thrust flange 59, thrust washer 59a, thrust plate 59b are then singly or collectively moved toward the right and positioned in the order named on the section 26 and thereafter the lock ring 59c is disposed in the groove at the end of the section 26. It may be noted that this provides a unitary structure of the impeller and stator assemblies and that in the above-described assembly operation, the various parts are successively positioned on the section 26 of the reaction sleeve.

To complete the assembly of the torque converter B, the turbine assembly T is connected to the unitary impeller and stator assemblies by inserting the bolts 58 into the openings in the turbine assembly T and threading the bolts into the annular thrust washer flange 59. This may be readily accomplished by threading taper end locating pins into some of the openings in the flange 59 to align all of the openings in the turbine assembly with all of the flange openings, while passing bolts 58 through the other openings in the flange 59 and threadedly engaging the openings in the turbine assembly T in alignment therewith, the locating pins then being removed and the remaining bolts being assembled with the flange 59 and turbine assembly T. The impeller assembly P, turbine assembly T, and stator assembly S are thus connected to provide the unitary torque converter structure B which can be handled without danger of dislocating or dislodging the parts thereof.

To connect the torque converter unit B with the flywheel unit D to provide the completely assembled and unitary drive mechanism shown in Fig. 3, the torque converter unit B may be readily connected to the flywheel unit D by engaging the flange 31 of the shell 30 of the pump assembly P with the axial flange 64 of the plate 63 of the flywheel unit D and moving the converter unit B toward the flywheel unit D, or vice versa, until the flange 31 of the shell engages the shoulder 65 of the flange 64 of the plate 63, the flanges then being secured together by the outside weld 66. It may be noted the welded flanges thus provide a leak-proof joint preventing the escape of fluid from the drive mechanism.

Referring to Fig. 2, the completely assembled drive mechanism, comprising the flywheel assembly D, the clutch assembly C, and the torque converter assembly B is shown in axially spaced relation to the engine-driven crankshaft 15 and the transmission input structure including the shafts 17 and 19. It is contemplated that the drive mechanisms be sent as individual units from the factory of the manufacturer of the drive mechanisms to the automobile manufacturer who can quickly and facilely assemble the drive mechanisms with the engine-driven and transmission input shafts of the automobiles. This simple assembly operation is readily accomplished by placing the drive mechanism between the engine crankshaft 15 and the transmission input structure, spaced as shown in Fig. 2, then moving the drive mechanism toward the crankshaft 15 to position the bolts of the bolt and nut assemblies 16a in the openings in the flange 16 of the crankshaft, whereupon the nuts of the bolt and nut assemblies 16a can then be utilized to secure the drive mechanism to the crankshaft; thereafter, the drive mechanism is assembled with the transmission input structure by aligning the axis of the shaft 17 of the structure with the axis of the crankshaft and, as shown in dotted lines in Fig. 2, moving the transmission structure toward the drive mechanism to engage the quill shaft 19 with the bushings 29 on the section 26 of the reaction sleeve and the external splines on the forward end of the shaft with the internal splines of the turbine hub 57; to connect the floating section 26 with the fixed section 24 of the reaction sleeve by the tongue and notch arrangement 27; to engage the external splines on the end of the shaft 17 with the internal splines of the elongate hub 83 of the clutch driven plate 80; to position the hub 33 of the pump P about the fixed rear section 24 of the reaction sleeve and then to connect the hub 33 with the driving portion 36 of the gear pump 12 by the tongue and notch arrangement 35; and thereafter bolting the bell housing A to the stationary portion 10 of the engine or the automobile chassis. It may be noted from an inspection of Fig. 2 that the engaging ends of the splines and also the tongues and notches on the various elements are chamfered, whereby the elements can be readily successively assembled with each other when they are brought into engaging alignment by rotating the flywheel one revolution.

It will be apparent from the foregoing description that the flywheel assembly D, the clutch assembly C, and the torque converter assembly B may each have its component parts manufactured and assembled at a factory as individual units and thereafter the flywheel, clutch, and torque converter assemblies may be connected together to provide unitary structures or drive mechanisms that can be sent to manufacturers of automobiles or power units.

The flexibility of the drive mechanism to adapt itself to different requirements of manufacturers desiring to employ the drive mechanism in their power transmission assemblies, such as used in automobiles, by making the flywheel assembly, the clutch assembly, and the torque converter assembly as separate unitary structures is believed to be clearly apparent for, in the event the specifications of the automobile or other manufacturers require a drive mechanism to connect a drive shaft with a single driven shaft, either of two drive mechanisms consisting of the flywheel assembly D and the torque converter assembly B, or the flywheel assembly B and the clutch assembly C can be readily provided inasmuch as each of the flywheel, clutch and torque converter assemblies are separate units independent of each other, and the flywheel assembly may be readily connected to either the clutch assembly or the torque converter assembly to provide a unitary structure to meet the manufacturer's requirements.

Referring to Fig. 1, an important feature of the torque converter unit of my drive mechanism is the construction and arrangement of the various component parts thereof to minimize wear of the thrust washers required between relatively rotatable parts of the converter to absorb axial thrust loads or forces in the converter.

It has been proven by tests that the axial thrust forces are maximum when the engine is driving through the torque converter, particularly when starting from a standstill under wide-open throttle of the engine, with maximum torque delivery by the engine to the torque converter, and these forces cause the pump and turbine elements of the torque converter to try to draw together. When the automobile is driving the engine, that is, when the accelerator is raised to close the throttle, or when using the engine as a brake, a reverse condition occurs in that the pump and turbine elements of the torque converter try to separate, and the resulting axial force is much smaller, as the torque required to drive the engine is much less than what the engine develops. Also, the length of time, that this latter condition prevails, represents but a fraction of the amount of time the engine drives the car. Consequently and referring to Fig. 1, the washers 51 which take the driving axial thrust forces, when the engine is driving the torque converter, are made much larger in area than the washers 40 and 59a taking the reverse thrust loads when the car is driving the engine under the conditions described above.

A further factor in eliminating frictional wear of the thrust washers in the torque converter B of my drive mechanism is that, since the driving thrust forces are taken through the stator freewheel housing 44 and 49, the only time slippage occurs at the friction surfaces of the thrust washers is when the automobile is started and the converter is operating to increase the torque output of the engine. The drive mechanism is adapted to be connected to a change-speed transmission and the torque converter B is effective to multiply the torque received from the engine during the initial forward variable speed ratio conditions of the transmission, and when the torque converter ceases to multiply engine torque, the clutch C is then engaged to provide a direct drive between the engine and the driving wheels of the automobile. In other words, the present drive mechanism contemplates that the clutch becomes engaged when the torque converter has performed its torque-multiplying and is operative as a fluid coupling to connect the engine crankshaft and the shaft 17 in a 1:1 ratio, and at such time it may be noted that the stator S will freewheel and the pump, turbine and stator assemblies, as well as the thrust washers disposed between the hubs of these elements and more particularly the thrust washers 45, 51, 40 and 59a, will all rotate together as a unit. Thus, no relative rotation of these assemblies and thrust washers, except the small slippage occurring due to the action of the torque converter as a fluid coupling, exists, and any friction at the thrust surfaces of the thrust washers is then useful to reduce slippage and improve efficiency.

Whenever the stator assembly S freewheels, there is, of course, relative rotation and consequent slippage occurring at the two bushings 50b which pilot the stator assembly on the floating section 26 of the reaction sleeve and at the sprags of the overrunning clutch 48. However, there will be no heavy radial loading of the stator so that this friction will be negligible.

Figure 4:
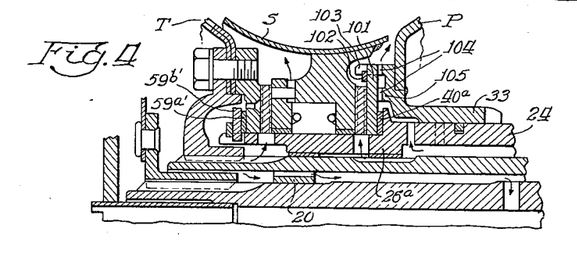
Fig. 4 is a view similar to Fig. 1 but illustrating a modification of the torque converter assembly of the drive mechanism.

When coasting or braking with the engine, the pump and turbine will tend to separate and the thrust washers 40 and 59a are put under load. While it is believed that the sizes of the thrust washers, as shown in Fig. 1, will be satisfactory to take these thrust loads, in the event conditions require the need for a greater area of these washers to take greater thrust loads, the alternate design shown in Fig. 4 can be used. As shown in Fig. 4, the floating section 26a of the reaction sleeve is provided with a radially extending flange portion of considerable diameter, the thrust plate 59b' is made of a like diameter, and the washers 40a and 59a' have like dimensions. A thrust plate 101 is utilized and is held in place by a lock ring 102. The thrust plate 101 may have a number of tongues in circumferentially spaced relation, and each of these tongues may engage slots 103 in the outer flange portion of the hub 33 of the impeller or pump P. A circular rib 105 on the hub 33 applies driving thrusts at as close to mean radius as possible to minimize any dishing of the plate 101. The slots 104 permit the passage of oil entering the torque converter.

It may be noted that the direction of the flow of oil entering and leaving the torque converter and the fluid-actuated clutch is indicated by arrows in Figs. 1 and 4, as will be described hereinafter. In my improved design of torque converter, all the thrusts are caused by the action of the fluid in the torque converter and, regardless of their direction, all the thrusts are contained in the torque converter. Any stack-up of tolerances due to normal production requirements will cause no thrust at any point, as the various splined engagements and tongue and notch engagements of the parts of the torque converter, as previously described, will assist in the parts finding their proper positions at initial assembly and then will remain in such positions. The crankshaft is usually machined to have an end play of around about .006 inch. If a crankshaft should have a tendency to float back and forth, this amount or more, the aforementioned splined and tongue-and-notch engagements would only have this endwise motion, and since all of these parts are under oil pressure as indicated by the arrows in Fig. 1, no harm should result.

The floating section 26 of the reaction sleeve can float fore and aft with movement of the converter due to end play or breathing of the housings or shells of the pump, turbine and stator elements of the torque converter, and still take the reaction through its tongue and slot connection to the fixed section 24 of the reaction sleeve.

Referring now to Figs. 1 and 4, the direction of the flow of oil in the drive mechanism is indicated by arrows. The check valve 85, inside the bore 18 of the shaft 17, is designed to permit the movement of oil in and out of the piston chamber 77 of the clutch assembly C without intermingling with the oil coming out of the converter and held under predetermined pressure by the check valve. The oil flows into the converter under pressure, and the oil will flow inside the fixed section 24 of the reaction sleeve and outwardly through the clearance in the tongue and slot connection 27 through a hole in the hub 33 into the entrance passage of the pump or impeller P, the piston ring type seal 39 being behind the tongue and slot connection 27 to prevent the passage of the oil into the bell housing A. A small amount of the oil will pass through a lengthwise groove in the quill shaft 19 outwardly through a hole to lubricate the rear thrust washers, the bushings 50b, and the sprags of the overrunning clutch. The slot 50a is made somewhat wider than the diameter of the pin 50 to permit oil to escape from the overrunning clutch to insure circulation of the oil. Other radial oil holes in the forward end of the floating section 26 of the reaction sleeve perform a similar function. It is contemplated that the thrust washer surfaces be provided with radial grooves across their surfaces and that the inner diameter of the stator hub bushings have lengthwise grooves to insure ample circulation of the oil. The oil coming out of the converter passes between the hub 83 of the driven clutch plate 80 and the quill shaft 19 through lengthwise slots in the outer diameter of the bushing 20 and then through the shaft 17 and the check valve 85 into a sump associated with the transmission.

While I have described the drive mechanism as being associated with the crankshaft of an engine and driven shafts of a transmission of an automotive vehicle for the purposes of illustrating a preferred embodiment of the invention, I wish it to be understood that my improved drive mechanism may be associated with a driving shaft connected to a power plant or any source of motive power, and with a driven shaft or driven shafts which may be connected to a pulley, a universal joint, or any other coupling or instrumentality for a transmitting torque or the driven shaft or driven shafts may form the input member or members of any power-driven machine or device; or, alternatively, one of two driven shafts may be connected to a coupling and the other of the shafts may be the input member of a power-driven machine or device.

While this invention has been described in detail in its present preferred form or embodiment, it will be apparent to persons skilled in the art, after understanding the improvements, that various changes and modifications may be made therein without departing from the spirit or scope thereof. It is aimed in the appended claims to cover all such changes and modifications.

I claim:

1. In combination with a drive shaft, a plurality of telescoped driven shafts, and a stationary bell housing having a rear wall supporting said driven shafts, a drive mechanism in said housing and adapted to drivingly connect said drive and driven shafts, said drive mechanism including a flywheel comprising a plate connected to said drive shaft; hydraulic torque converter means drivingly connecting the outer shaft of said driven shafts to said flywheel plate and comprising a reaction sleeve surrounding said outer shaft and having a first stationary section secured to said housing wall and a second floating section having a tongue and notch connection with said first section for movement axially of said driven shafts, and a plurality of assemblies arranged in successive order forwardly of said rear wall of said housing and including: first, a vaned semi-torodial pump shell connected to said flywheel plate and having a hub surrounding said reaction sleeve; second, a vaned semi-torodial stator shell cooperatively associately with said pump shell and having a hub rotatably mounted on said floating section of said reaction sleeve forwardly of said pump shell hub, and overrunning clutch means in said stator hub for cooperatively associating said stator hub and said floating section of said reaction sleeve; third, a vaned semi-torodial turbine shell cooperatively associated with said stator and rotatably supported on said floating section of said reaction sleeve and pump shells and having a hub splined on the outer shaft of said driven shafts, forwardly of said overrunning clutch means, for driving said outer shaft the tongues on one of said sections of said reaction sleeve and the notches on the other of said sections of said reaction sleeve facing each other axially of said driven shaft to connect and disconnect said floating section and thereby said pump, turbine, stator shells, and overrunning clutch means as a unit with respect to said stationary section and said driven shafts; and a friction clutch assembly for drivingly connecting said flywheel plate and the inner shaft of said driven shafts and disposed between said flywheel and said torque converter means, said clutch assembly comprising a friction clutch driven plate having a hub splined to said inner shaft, and a pair of clutch plates carried by said flywheel plate and disposed on opposite sides of said driven plate and adapted for relative axial movement to engage said driven clutch plate.

2. A drive mechanism as defined in claim 1 wherein the flywheel; said shells, overrunning clutch means, and floating section of said reaction sleeve of said torque converter means; and said friction clutch assembly, form a completely assembled structure adapted, as a unit, to be connected to the drive shaft, and cooperatively associated with the driven shafts and the stationary section of the reaction sleeve by relative axial movement of said driven shafts and stationary section into connective relationship with the turbine shell hub, friction clutch driven plate hub, and floating section as described.

3. In combination with a drive shaft and a plurality of telescoped driven shafts rotatable about an axis, a drive mechanism adapted to drivingly connect said drive and driven shafts, said drive mechanism including a flywheel connected to said drive shaft; hydraulic torque converter means drivingly connecting the outer shaft of said driven shafts to said flywheel and comprising a reaction sleeve surrounding said outer shaft and having a first stationary section and a second floating section having a tongue and notch connection with said first section for movement axially of said driven shafts, and a plurality of assemblies arranged in successive order forwardly from a radial plane intersecting the axis of said driven shafts and toward said drive shaft and including: first, a vaned semi-toroidal pump shell connected to said flywheel and having a hub surrounding said reaction sleeve; second, a vaned semi-toroidal stator shell cooperatively associated with said pump shell and having a hub rotatably mounted on said floating section of said reaction sleeve forwardly of said pump shell hub, and overrunning clutch means cooperatively associating said stator hub and said floating section of said reaction sleeve; third, a vaned semi-toroidal turbine shell cooperatively associated with said stator and pump shells and rotatably supported on said floating section of said reaction sleeve and having a hub splined on the outer shaft of said driven shafts, forwardly of said clutch means, for driving said outer shaft; and a friction clutch assembly for drivingly connecting said flywheel and the inner shaft of said driven shafts and disposed between said flywheel and said torque converter means, said clutch assembly comprising a friction clutch driven plate having a hub splined to said inner shaft, an axially shiftable piston-like pressure plate carried by said flywheel in spaced relation thereto and defining therewith a fluid pressure chamber, a clutch back plate carried by said flywheel alongside said clutch driven plate and rearwardly of said pressure plate, the radially outer region of said clutch driven plate lying between said pressure plate and back plate, said pressure plate being movable toward said driven plate for engaging said pressure and back plates with said driven plate upon supplying pressure fluid to said chamber.

4. In combination with a drive shaft and a plurality of telescoped driven shafts rotatable about an axis, a drive mechanism adapted to drivingly connect said drive and driven shafts, said drive mechanism including hydraulic torque converter means drivingly connecting the outer shaft of said driven shafts to said drive shaft and comprising a reaction sleeve surrounding said outer shaft and having a first stationary section and a second floating section cooperatively associated with said first section for movement axially of said driven shafts, and a plurality of assemblies arranged in successive order forwardly from a radial plane intersecting the axis of said driven shafts and toward said drive shaft and including: first, a vaned semi-toroidal pump shell connected to said drive shaft and having a hub surrounding said reaction sleeve; second, a vaned semi-toroidal stator shell cooperatively associated with said pump shell and having a hub rotatably mounted on said floating section of said reaction sleeve forwardly of said pump shell hub, and overrunning clutch means cooperatively associating said stator hub and said floating section of said reaction sleeve; third, a vaned semi-toroidal turbine shell cooperatively associated with said stator and pump shells and having a hub splined on the outer shaft of said driven shafts, forwardly of said clutch means, for driving said outer shaft; and a friction clutch assembly for drivingly connecting said drive shaft and the inner shaft of said driven shafts and disposed between said drive shaft and said torque converter means, said clutch assembly comprising a friction clutch driven plate having a hub splined to said inner shaft, an axially shiftable pressure plate supported by said drive shaft and disposed at one side of said driven plate, and another clutch plate supported by said drive shaft at the other side of said driven plate.

5. In combination with a drive shaft, a plurality of telescoped driven shafts, and a stationary housing having a rear wall supporting said driven shafts, a drive mechanism in said housing and adapted to drivingly connect said drive and driven shafts, said drive mechanism including a flywheel connected to said drive shaft; hydraulic torque converter means drivingly connecting the outer shaft of said driven shafts to said flywheel and comprising a reaction sleeve surrounding said outer shaft and having a first section secured to said housing wall and a second floating section cooperatively associated with said first section, a vaned semi-toroidal pump shell connected to said flywheel and having a hub surrounding said reaction sleeve, a vaned semi-toroidal stator shell cooperatively associated with said pump shell and having a hub rotatably mounted on said floating section of said reaction sleeve, overrunning clutch means in said stator hub for cooperatively associating said stator hub and said floating section of said reaction sleeve, a vaned semi-toroidal turbine shell cooperatively associated with said stator and pump shells and having a hub splined on the outer shaft of said driven shafts for driving said outer shaft; and a friction clutch assembly for drivingly connecting said flywheel and the inner shaft of said driven shafts and disposed between said flywheel and said torque converter means, said clutch assembly comprising a friction clutch driven plate having a hub splined to said inner shaft, a pair of clutch plates carried by said flywheel and including an axially shiftable pressure plate engageable with said driven plate.

6. In combination with a drive shaft and telescoped driven shafts, a drive mechanism comprising a reaction sleeve surrounding said driven shafts, said sleeve having a fixed section and a floating section arranged for movement axially of said driven shafts; a vaned semi-toroidal pump member surrounding said sleeve and connected to said drive shaft; a vaned semi-toroidal stator member rotatable on the floating section of said sleeve; a vaned semi-toroidal turbine member carried by and rotatable with the outer shaft of said driven shafts and having a thrust portion supported on said floating section of said sleeve, said pump, stator and turbine members being cooperatively associated with each other to define a hydraulic torque converter adapted to drivingly connect said drive shaft and said outer shaft; a friction clutch assembly between said drive shaft and said torque converter and comprising a driven friction plate drivingly connected to the inner shaft of said driven shafts, and clutch plates connected to and driven by said drive shaft and engageable with said driven plate.

7. A drive mechanism as defined in claim 6 wherein the torque converter, the clutch assembly, and the floating section of the reaction sleeve form an assembly adapted to be mounted as a unit on the drive shaft and associated with the fixed section of the reaction sleeve and said driven shafts as described.

8. In combination with a rotatable drive shaft, a rotatable driven shaft, and a quill shaft journaled for rotation on said driven shaft; a drive mechanism comprising a drive member connected to said drive shaft; a reaction sleeve having axially spaced, fixed and floating portions surrounding said quill shaft and provided with detachable interengageable means at their adjacent ends for connecting said portions and for detaching said portions by relative axial movement of said floating portion and said fixed portion; a plurality of structurally independent vaned semi-toroidal assemblies disposed in successive order forwardly from a plane intersecting the axis of said driven shafts and toward said drive shaft and arranged in cooperative association with each other to define a hydraulic torque converter assembly, said semi-toroidal assemblies being rotatable about said reaction sleeve and one of said semi-toroidal assemblies being connected to said drive member and another of said assemblies being splined on said quill shaft forwardly of the remaining assemblies and being effective to drive said quill shaft; a friction clutch assembly between said drive shaft and said torque converter assembly, one member of said clutch assembly being drivingly connected to said driven shaft, and the remaining members of said clutch assembly being carried by and rotatable with said drive member.

9. A drive mechanism as defined in claim 8 wherein the torque converter assembly, the friction clutch assembly, the drive member and the floating portion of the reaction sleeve form a completely assembled structure adapted to be mounted as a unit on the drive shaft and cooperatively associated with the fixed portion of the reaction sleeve and the driven and quill shafts as described by axial movement of the latter sleeve and shafts relative to said torque converter and friction clutch assemblies.

10. In combination with a drive shaft, a driven shaft, and a quill shaft journaled for rotation on said driven shaft, a drive mechanism comprising a reaction member having a fixed stationary portion and a floating portion connected thereto and movable axially of said shafts, said fixed and said floating portions being spaced seriately along the axis of the quill shaft and having their adjacent ends connected to prevent rotation of said floating portion; a plurality of vaned semi-toroidal units arranged in cooperative association with each other to define a hydrodynamic coupling device, said units being rotatable about the floating portion of said reaction member and comprising a vaned pump shell and a vaned turbine shell respectively connected to said drive shaft and to said quill shaft; and an hydraulically operable friction clutch assembly between said drive shaft and said coupling device adapted to establish a driving connection with said driven shaft and having a driving connection with one of the semi-toroidal units on said reaction member; and means for supplying pressure fluid to said clutch assembly for effecting engagement and disengagement thereof.

11. In combination with a drive shaft, a driven shaft, and a quill shaft journaled for rotation on said driven shaft; a drive mechanism comprising a drive member, a reaction member having a fixed stationary portion and a floating portion connected thereto and movable axially of said shafts, said fixed and said floating portions being spaced seriately along the axis of the quill shaft and having their adjacent ends connected to prevent rotation of said floating portion while permitting disconnection of said floating portion from said fixed portion by relative movement axially of said shaft; a plurality of vaned semi-toroidal units arranged in cooperative association with each other to define a hydrodynamic coupling device, said units being rotatable about the floating portion of said reaction member and comprising a vaned pump shell and a vaned turbine shell respectively connected to said drive member and to said quill shaft; and a friction clutch assembly between said drive shaft and said coupling device and comprising a pair of driving clutch plates supported by said drive member and a driven plate connected to said driven shaft, one of said driving clutch plates being movable toward said driven plate to engage the same with said driving clutch plates.

12. A drive mechanism as defined in claim 11 wherein the drive member, hydrodynamic coupling device, friction clutch assembly, and floating portion of said reaction member, form a completely assembled structure adapted to be mounted as a unit on the drive shaft and cooperatively associated with the fixed stationary portion of the reaction member, the driven shaft, and quill shaft, as described, by axial movement of the latter member and shafts into connective relationship with the floating portion of the reaction member, the driven friction clutch plate, and turbine shell, respectively.

13. In combination with axially aligned drive and driven shafts, and a stationary housing having a rear wall supporting said driven shaft, a drive mechanism in said housing and adapted to drivingly connect said drive and driven shafts, said drive mechanism comprising hydraulic torque converter means drivingly connecting said driven shaft to said drive shaft and comprising a reaction sleeve surrounding said driven shaft and having a first section secured to said housing wall and a second floating section cooperatively associated with said first section for movement axially of said driven shaft, and a plurality of assemblies arranged in successive order forwardly of said rear wall of said housing and including: first, a vaned semi-toroidal pump shell connected to said drive shaft and having a hub surrounding said reaction sleeve; second, a vaned semi-toroidal stator shell cooperatively associated with said pump shell and having a hub rotatably mounted on said floating section of said reaction sleeve forwardly of said pump shell hub, and overrunning clutch means in said stator hub for cooperatively associating said stator hub and said floating section of said reaction sleeve; third, a vaned semi-toroidal turbine shell cooperatively associated with said stator and pump shells and having a thrust portion rotatable about the floating section of said reaction sleeve and having a hub splined on said driven shaft, forwardly of said clutch means, for driving said driven shaft; and thrust washers between said stator hub and said pump hub and between said stator hub and said turbine thrust portion.

14. In combination with axially aligned drive and driven shafts, a hydraulic torque converter assembly adapted to drivingly connect said drive and driven shafts and comprising a stationary reaction sleeve surrounding said driven shaft; a vaned pump connected to said drive shaft and having a hub rotatable about said sleeve; a vaned turbine having a hub connected to said driven shaft, and a thrust member rotatable about said sleeve; a vaned stator between said pump and turbine and having a hub rotatable on said sleeve; an overrunning clutch between said stator hub and said sleeve; and thrust washers surrounding said reaction sleeve and disposed between said stator hub and said pump hub and between said stator hub and said turbine thrust member.

15. In combination with axially aligned drive and driven shafts, and a stationary housing having a rear wall supporting said driven shaft, a drive mechanism in said housing and adapted to drivingly connect said drive and driven shafts, said drive mechanism including a drive member connected to said drive shaft; hydraulic torque converter means drivingly connecting said driven shaft to said drive member and comprising a reaction sleeve surrounding said driven shaft and having a first section secured to said housing wall and a second floating section connected to said first section for movement axially of said driven shaft, and a plurality of assemblies arranged in successive order forwardly of said rear wall of said housing and including: first, a vaned semi-toroidal pump shell connected to said flywheel plate and having a hub surrounding said reaction sleeve; second, a vaned semi-toroidal stator shell cooperatively associated with said pump shell and having a hub rotatably mounted on said floating section of said reaction sleeve forwardly of said pump shell hub, and overrunning clutch means in said stator hub for cooperatively associating said stator hub and said floating section of said reaction sleeve; third, a vaned semi-toroidal turbine shell cooperatively associated with said stator and pump shells and having a radially inner portion thereof rotatable on said floating section of said reaction sleeve and a hub splined on said driven shaft, forwardly of said clutch means, for driving said driven shaft.

16. A drive mechanism as defined in claim 15 wherein the drive member; the vaned pump, stator, and turbine shells; the overrunning clutch means; and floating section of said reaction sleeve form a completely assembled structure adapted to be connected as a unit to the drive shaft and cooperatively associated with the first section of the reaction sleeve and driven shaft as described.

17. In combination with axially aligned drive and driven shafts, and a stationary member surrounding said driven shaft, a drive mechanism adapted to drivingly connect said drive and driven shafts, said drive mechanism including a drive member connected to said drive shaft; hydraulic torque converter means drivingly connecting said driven shaft to said drive member and comprising a floating reaction sleeve surrounding said driven shaft and connected with said stationary member for movement axially of said driven shaft, and a plurality of assemblies arranged in successive order forwardly from said stationary member toward said drive member and including: first, a vaned semi-toroidal pump shell connected to said drive member and having a hub surrounding said floating reaction sleeve; second, a vaned semi-toroidal stator shell cooperatively associated with said pump shell and having a hub rotatably mounted on said floating reaction sleeve forwardly of said pump shell hub, and overrunning clutch means in said stator hub for cooperatively associating said stator hub and said floating reaction sleeve; third, a vaned semi-toroidal turbine shell cooperatively associated with said stator and pump shells and having a radially inner portion rotatable on said floating sleeve and a hub with a splined connection to said driven shaft, forwardly of said clutch means, for driving said driven shaft.

18. A drive mechanism as defined in claim 17 wherein stop means are associated with said sleeve adjacent said pump shell hub and the radial inner portion of said turbine shell to maintain said pump, stator, and turbine shells assembled with said sleeve to provide an assembled structure engageable and connectible as a unit to said drive member, said driven shaft and said stationary member being movable relative to said torque converter means axially thereof to position said driven shaft within said sleeve and to engage the splines of said driven shaft with the splines of said turbine shell hub, and to connect said sleeve with said stationary member.

19. In combination with axially aligned drive and driven shafts, and a stationary member surrounding said driven shaft, a drive mechanism adapted to drivingly connect said drive and driven shafts, said drive mechanism including a drive member connected to said drive shaft; hydraulic torque converter means drivingly connecting said driven shaft to said drive member and comprising a floating reaction sleeve surrounding said driven shaft and connected to said stationary member for movement axially thereof, a vaned semi-toroidal pump shell connected to said drive member and having a hub surrounding said reaction sleeve, a vaned semi-toroidal stator shell cooperatively associated with said pump shell and having a hub rotatably mounted on said floating reaction sleeve, overrunning clutch means cooperatively associating said stator hub and said floating reaction sleeve, a vaned semi-toroidal turbine shell cooperatively associated with said stator and pump shells and having a radially inner portion rotatable on said reaction sleeve and a hub with a splined connection to said driven shaft for driving said driven shaft.

20. A drive mechanism as defined in claim 19 wherein stop means are provided adjacent opposite ends of said floating reaction sleeve to maintain said torque converter means in assembly with said sleeve and to provide an assembly adapted as a unit to be connected to said drive member, said driven shaft and said stationary member being movable relative to said torque converter means axially thereof to position said driven shaft within said sleeve and to engage the splines of said driven shaft with the splines of said turbine shell hub, and to connect said sleeve with said stationary member.

21. A drive mechanism as defined in claim 19 wherein stop means are provided adjacent opposite ends of said floating reaction sleeve to maintain said vaned shells in proper axial relationship and to contain within said floating reaction sleeve all axial forces in either direction caused by the circulation of fluid in said shells during operation of said torque converter means.

22. A hydraulic torque converter comprising a reaction sleeve; a vaned semi-toroidal pump shell assembly having a hub surrounding said reaction sleeve; a vaned semi-toroidal stator shell assembly cooperatively associated with said pump shell assembly and having a hub rotatable about said reaction sleeve; overrunning clutch means in said stator hub for cooperatively associating said stator hub and said reaction sleeve; a vaned semi-toroidal turbine shell assembly cooperatively associated with said stator and pump shell assemblies and having a hub, said turbine shell assembly also having a radially inner portion in spaced relation to the hub thereof and rotatable about said sleeve; and thrust washers surrounding said sleeve and disposed between said stator shell hub and said radially inner portion of said turbine shell, and between said stator hub and said pump shell hub.

23. A hydraulic torque converter as defined in claim 22 wherein stop means are provided adjacent opposite ends of said reaction sleeve to maintain said assemblies and said thrust washers in proper axial relationship and to contain within said reaction sleeve all axial forces in either direction caused by the circulation of fluid in said shell assemblies during operation of said torque converter.

24. A hydraulic torque converter comprising a reaction sleeve; a vaned semi-toroidal pump shell assembly having a hub surrounding said reaction sleeve; a vaned semi-toroidal stator shell assembly cooperatively associated with said pump shell assembly and having a hub rotatable about said reaction sleeve; overrunning clutch means in said stator hub for cooperatively associating said stator hub and said reaction sleeve; a vaned semi-toroidal turbine shell assembly cooperatively associated with said stator and pump shell assemblies and having a hub, said turbine shell assembly also having a radially inner portion in spaced relation to the hub thereof and rotatable about said sleeve; and spaced stop means on said sleeve to maintain said pump, turbine and stator shell assemblies in assembly with said sleeve.

25. A hydrodynamic coupling device comprising a mounting member; a vaned driving element rotatable about said mounting member; a vaned driven element rotatable about said mounting member; and a pair of spaced stop means on said mounting member and receiving portions of said driving and driven elements therebetween to maintain said elements in assembly with said mounting member.

26. A hydrodynamic coupling device comprising a stationary mounting member; a vaned driving element rotatable about said mounting member; a vaned driven element rotatable about said mounting member; a pair of spaced stop means on said mounting member and receiving portions of said driving and driven elements therebetween to maintain said elements in assembly with said mounting member, and thrust washers on said mounting member and between said driving and driven elements, and between said stop means and respective driving and driven elements.

27. A hydrodynamic coupling device comprising a stationary mounting member; a vaned driving element rotatable about said mounting member; a vaned driven element rotatable about said mounting member; a pair of spaced stop means on said mounting member and receiving portions of said driving and driven elements therebetween, and thrust washers on said mounting member and between said driving and driven elements, and between said stop means and respective driving and driven elements, said stop means being effective to maintain said vaned elements in proper axial relationship and to contain within said mounting member all axial forces in either direction caused by the circulation of fluid in said vaned driven elements during operation of the hydrodynamic coupling device.

28. A drive mechanism adapted to be connected to drive and driven shafts and a fixed reaction member and comprising a drive plate connectible to the drive shaft; and a hydraulic torque converter assembly comprising a reaction sleeve having portions of different diameters between its ends to provide a shoulder, a plurality of vaned semitoroidal shell assemblies and parts associated therewith arranged successively in the following order named on the portion of said sleeve having the smaller diameter: a first thrust washer engaging said shoulder, a pump assembly connected to said drive plate and having a hub surrounding said sleeve and abutting said first thrust washer, a second thrust washer engaging said pump assembly hub, a stator assembly having a two-part hub journaled on said sleeve and engaging said second thrust washer, said stator assembly hub including an overrunning clutch within one of said hub parts and cooperatively associating said hub and sleeve and the other hub part having a pin fixed thereto and engaging an opening in said one hub part to retain said clutch within said hub, a third thrust washer engaging said stator assembly hub, an annular thrust member rotatable about said sleeve and engaging said third thrust washer, a fourth thrust washer engaging said thrust member of said turbine assembly, stop means fixed to said sleeve, and a turbine assembly having a hub connected to said thrust member and spaced from said sleeve.

References Cited in the file of this patent

UNITED STATES PATENTS

| | | |
|---|---|---|
| 1,203,265 | Radcliffe | Oct. 31, 1916 |
| 2,074,170 | Dunn | Mar. 16, 1937 |
| 2,142,199 | Lysholm et al. | Jan. 3, 1939 |
| 2,204,779 | Swennes | June 18, 1940 |
| 2,301,957 | Lang | Nov. 17, 1942 |
| 2,351,483 | Carnagua | June 13, 1944 |
| 2,414,359 | Carnagua et al. | Jan. 14, 1947 |
| 2,442,840 | Carnagua | June 8, 1948 |
| 2,463,582 | Wemp | Mar. 8, 1949 |
| 2,591,342 | Dodge | Apr. 1, 1952 |
| 2,603,984 | Swift | July 22, 1952 |
| 2,627,189 | McFarland | Feb. 3, 1953 |